United States Patent
Chidate

(10) Patent No.: US 11,725,114 B2
(45) Date of Patent: Aug. 15, 2023

(54) AQUEOUS INK JET INK COMPOSITION, INK SET, AND RECORDING METHOD

(71) Applicant: Seiko Epson Corporation, Tokyo (JP)

(72) Inventor: Kosuke Chidate, Shiojiri (JP)

(73) Assignee: SEIKO EPSON CORPORATION

(*) Notice: Subject to any disclaimer, the term of this patent is extended or adjusted under 35 U.S.C. 154(b) by 36 days.

(21) Appl. No.: 17/559,173

(22) Filed: Dec. 22, 2021

(65) Prior Publication Data
US 2022/0204791 A1    Jun. 30, 2022

(30) Foreign Application Priority Data
Dec. 25, 2020   (JP) .................... 2020-216425

(51) Int. Cl.
| | | |
|---|---|---|
| C09D 11/38 | (2014.01) |
| C09D 11/104 | (2014.01) |
| C09D 11/107 | (2014.01) |
| C09D 11/40 | (2014.01) |
| C09D 11/54 | (2014.01) |
| D06P 5/30 | (2006.01) |
| D06P 5/00 | (2006.01) |
| D06P 1/52 | (2006.01) |
| B41M 5/00 | (2006.01) |
| B41J 3/407 | (2006.01) |
| B41J 11/00 | (2006.01) |
| C09D 11/033 | (2014.01) |
| D06P 3/52 | (2006.01) |
| D06P 3/24 | (2006.01) |

(52) U.S. Cl.
CPC ............ *C09D 11/38* (2013.01); *B41J 3/4078* (2013.01); *B41J 11/002* (2013.01); *B41M 5/0023* (2013.01); *C09D 11/033* (2013.01); *C09D 11/104* (2013.01); *C09D 11/107* (2013.01); *C09D 11/40* (2013.01); *C09D 11/54* (2013.01); *D06P 1/525* (2013.01); *D06P 1/5271* (2013.01); *D06P 1/5285* (2013.01); *D06P 5/002* (2013.01); *D06P 5/30* (2013.01); *D06P 3/24* (2013.01); *D06P 3/52* (2013.01)

(58) Field of Classification Search
CPC ..... C09D 11/322; C09D 11/38; C09D 11/033; B41J 2/2107; B41J 3/4078; B41M 5/0023; B33Y 70/00
See application file for complete search history.

(56) References Cited

U.S. PATENT DOCUMENTS

| | | | |
|---|---|---|---|
| 6,554,891 B1* | 4/2003 | Momose | C09D 11/40 106/478 |
| 2008/0233429 A1* | 9/2008 | Oguma | H05B 33/14 528/391 |
| 2010/0313787 A1* | 12/2010 | Bene | C09D 11/033 106/31.13 |
| 2020/0361136 A1* | 11/2020 | Fenn | B29C 64/336 |
| 2021/0403741 A1* | 12/2021 | Ozawa | B41J 2/2107 |

FOREIGN PATENT DOCUMENTS

| | | |
|---|---|---|
| JP | 2006-089559 A | 4/2006 |
| JP | 2009-215506 A | 9/2009 |
| JP | 2010-248357 A | 11/2010 |

* cited by examiner

*Primary Examiner* — John Zimmermann
(74) *Attorney, Agent, or Firm* — Harness, Dickey & Pierce, P.L.C.

(57) ABSTRACT

An aqueous ink jet ink composition contains an organic solvent with an SP value of 9.5 to 10.5, resin particles, a plasticizer, and water. With respect to the amount of the aqueous ink jet ink composition, 1.0% by mass to 10.0% by mass of the organic solvent is contained.

12 Claims, No Drawings

AQUEOUS INK JET INK COMPOSITION, INK SET, AND RECORDING METHOD

The present application is based on, and claims priority from JP Application Serial Number 2020-216425, filed Dec. 25, 2020, the disclosure of which is hereby incorporated by reference herein in its entirety.

BACKGROUND

1. Technical Field

The present disclosure relates to an aqueous ink jet ink composition, an ink set, and a recording method.

2. Related Art

An ink jet recording method can be used to record a high-resolution image with a relatively simple device and has developed rapidly in various fields. In the meantime, various investigations have been made, for example, on the rubbing fastness of a printed matter. For example, JP-A-2009-215506 (hereinafter referred to as Patent Document 1) discloses a textile printing ink jet ink for the purpose of providing a textile printed matter with excellent rubbing fastness. The textile printing ink jet ink contains pigment, a water-dispersible resin, a crosslinking agent, and water. The textile printing ink jet ink contains, as the water-dispersible resin, a predetermined amount of resin having a predetermined film elongation and tensile strength and, as the crosslinking agent, a predetermined amount of a blocked isocyanate compound.

However, it has become clear that, when a crosslinking agent and resin therefor are used in combination as described in Patent Document 1 from the viewpoint of rubbing fastness, the storage stability of an ink composition decreases due to the reactivity of the crosslinking agent.

SUMMARY

The present disclosure is an aqueous ink jet ink composition containing an organic solvent with an SP value of 9.5 to 10.5, resin particles, a plasticizer, and water. With respect to the amount of the aqueous ink jet ink composition, 1.0% by mass to 10.0% by mass of the organic solvent is contained.

The present disclosure is an ink set including the aqueous ink jet ink composition and a treatment solution composition containing resin selected from a polyurethane resin and a polyester resin and water.

Furthermore, the present disclosure is a recording method including an ink application step of applying the aqueous ink jet ink composition to a recording medium by discharging the aqueous ink jet ink composition by an ink jet process.

DESCRIPTION OF EXEMPLARY EMBODIMENTS

An embodiment (hereinafter referred to as "this embodiment") of the present disclosure is described below in detail. The present disclosure is not limited to the embodiment. Various modifications can be made without departing from the scope of the present disclosure.

1. Aqueous Ink Jet Ink Composition

An aqueous ink jet ink composition (hereinafter also simply referred to as the "ink composition") according to this embodiment contains an organic solvent, resin particles, a plasticizer, and water. The organic solvent has an SP value of 9.5 to 10.5. With respect to the amount of the aqueous ink jet ink composition, 1.0% by mass to 10.0% by mass of the organic solvent is contained.

Forming a relatively strong ink coating film on a recorded matter by using a crosslinking agent and resin corresponding thereto in combination is known as one of methods for enhancing the rubbing fastness of pigment textile printing ink compositions of the related art. However, allowing an ink composition to contain such a reactive component causes a problem that the storage stability of the ink composition decreases.

On the other hand, in this embodiment, the plasticizer is used to enhance the film formability of the resin particles, thereby enabling following properties of an ink coating film for a recording medium such as fabric to be enhanced even if pigment aggregates adhere to the recording medium. This allows the ink coating film to be not easily broken. As a result, the rubbing fastness can be enhanced. The texture of a recorded matter to be obtained can be enhanced by enhancing following properties.

The plasticizer has relatively high hydrophobicity and tends to be not easily dissolved stably in an aqueous ink composition. However, in this embodiment, the organic solvent, which has a predetermined SP value, is used, thereby enabling the solubility of the plasticizer in the aqueous ink composition to be improved and enabling the storage stability to be enhanced. Components of the ink composition according to this embodiment are described below in detail.

1.1. Organic Solvent

The organic solvent, which can be used in this embodiment, is not particularly limited. Examples of the organic solvent include glycols, glycol monoethers, glycol diethers, glycol monoesters, glycol diesters, nitrogen-containing solvents, monovalent alcohols, and polyvalent alcohols such as glycerin.

The glycols are not particularly limited. Examples of the glycols include ethylene glycol, diethylene glycol, triethylene glycol, propylene glycol, dipropylene glycol, 1,3-propanediol, 1,2-butanediol, 1,2-pentanediol, 2-methylpentane-1,3-diol, 2-methylpentane-1,4-diol, 1,2-hexanediol, 1,4-butanediol, 1,5-pentanediol, and 1,6-hexanediol.

The glycol monoethers are not particularly limited. Examples of the glycol monoethers include ethylene glycol monomethyl ether, ethylene glycol monoethyl ether, diethylene glycol monomethyl ether, ethylene glycol monobutyl ether, diethylene glycol monoethyl ether, diethylene glycol monobutyl ether, propylene glycol monomethyl ether, propylene glycol monoethyl ether, dipropylene glycol monomethyl ether, dipropylene glycol monoethyl ether, and triethylene glycol monomethyl ether.

The glycol diethers are not particularly limited. Examples of the glycol diethers include ethylene glycol dimethyl ether, ethylene glycol diethyl ether, ethylene glycol dibutyl ether, diethylene glycol dimethyl ether, and diethylene glycol diethyl ether.

The glycol monoesters are not particularly limited. Examples of the glycol monoesters include ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxybutyl acetate.

The glycol diesters are not particularly limited. Examples of the glycol diesters include ethylene glycol diacetate, diethylene glycol diacetate, propylene glycol diacetate, dipropylene glycol diacetate, ethylene glycol acetate propionate, ethylene glycol acetate butylate, diethylene glycol acetate butylate, diethylene glycol acetate propionate, diethylene glycol acetate butylate, propylene glycol acetate propionate, propylene glycol acetate butylate, dipropylene glycol acetate butylate, and dipropylene glycol acetate propionate.

The nitrogen-containing solvents are not particularly limited. Examples of the nitrogen-containing solvents include 2-pyrrolidone, N-methyl-2-pyrrolidone, and N-ethyl-2-pyrrolidone.

The monovalent alcohols are not particularly limited. Examples of the monovalent alcohols include alcohols such as methanol, ethanol, n-propyl alcohol, iso-propyl alcohol, n-butanol, 2-butanol, tert-butanol, iso-butanol, n-pentanol, 2-pentanol, 3-pentanol, and tert-pentanol.

The ink composition according to this embodiment contains the organic solvent, which has an SP value of 9.5 to 10.5, among these organic solvents and may contain another organic solvent having an SP value other than this as required.

The term "SP value" refers to a solubility parameter. The SP value is a value which has been introduced by Hildebrand and which has been defined by regular theory. The SP value of the organic solvent is a value determined by calculation from the evaporation energy and molar volume of atoms and atomic groups by Fedors as described in Coating Basics and Engineering (page 53, Yuji Harasaki, Converting Technical Institute). The unit for the SP value in this embodiment is $(cal/cm^3)^{1/2}$, which can be converted into the unit $(J/m^3)^{1/2}$ using $1\ (cal/cm^3)^{1/2} = 2.046 \times 10^3\ (J/m^3)^{1/2}$.

The organic solvent, which has an SP value of 9.5 to 10.5, is not particularly limited. Examples of the organic solvent include 2-methylpentane-1,3-diol (an SP value of 10.3), 2-methylpentane-1,4-diol, ethylene glycol monoethyl ether (an SP value of 10.5), ethylene glycol monobutyl ether (an SP value of 9.5), diethylene glycol monoethyl ether (an SP value of 10.2), diethylene glycol monobutyl ether (an SP value of 10.2), and ethylene glycol diacetate (an SP value of 10.0). Among these, methylpentanediols such as 2-methylpentane-1,3-diol (an SP value of 10.3) and 2-methylpentane-1,4-diol are preferable and 2-methylpentane-1,3-diol is more preferable. Using the organic solvent, which has an SP value of 9.5 to 10.5, tends to further enhance the rubbing fastness, the storage stability, and the texture of a recorded matter to be obtained. In particular, using the organic solvent allows the solubility of the plasticizer and the storage stability to be good. These organic solvents may be used alone or in combination.

The content of the organic solvent, which has an SP value of 9.5 to 10.5, is 1.0% by mass to 10.0% by mass, preferably 1.5% by mass to 9.0% by mass, more preferably 2.0% by mass to 8.0% by mass, further more preferably 1.5% by mass to 7.0% by mass, and still further more preferably 1.5% by mass to 3.5% by mass with respect to the amount of the ink composition. The fact that the content of the organic solvent, which has an SP value of 9.5 to 10.5, is 1.0% by mass or more tends to further enhance the rubbing fastness, the storage stability, and the texture of a recorded matter to be obtained. The fact that the content of the organic solvent, which has an SP value of 9.5 to 10.5, is 10.0% by mass or less tends to further enhance the rubbing fastness, the storage stability, and the delamination resistance of a printed surface.

An organic solvent having another SP value is not particularly limited and is preferably, for example, a water-soluble organic solvent such as glycerin or triethylene glycol. The SP value of the organic solvent having another SP value is preferably more than 10.5. That is, the organic solvent having another SP value is preferably a solvent with higher hydrophilicity.

The content of the organic solvent having another SP value is preferably 5.0% by mass to 25% by mass, more preferably 10% by mass to 20% by mass, and further more preferably 12.5% by mass to 17.5% by mass, with respect to the amount of the ink composition. The fact that the content of the organic solvent having another SP value is within the above range tends to further enhance the rubbing fastness, the storage stability, the delamination resistance of a printed surface, and the texture of a recorded matter.

The sum of the contents of the organic solvents is preferably 5.0% by mass to 30% by mass, more preferably 7.5% by mass to 27.5% by mass, and further more preferably 15% by mass to 25% by mass, with respect to the amount of the ink composition. The fact that the sum of the contents of the organic solvents is within the above range tends to further enhance the rubbing fastness, the storage stability, the delamination resistance of a printed surface, and the texture of a recorded matter.

1.2. Resin Particles

The resin particles are not particularly limited. Examples of the resin particles include acrylic resin particles, urethane resin particles, polyester resin particles, and polyethylene resin particles. Among these, the urethane resin particles are preferable. Using the resin particles tends to further enhance the rubbing fastness, the storage stability, the delamination resistance of a printed surface, and the texture of a recorded matter. The resin particles may be used alone or in combination with other resin particles.

The acrylic resin particles are not particularly limited. For example, one made by polymerizing a (meth)acrylic monomer such as (meth)acrylic acid or a (meth)acrylic ester and one made by copolymerizing such a (meth)acrylic monomer and another monomer are cited. In particular, anionic acrylic resin particles are preferable.

The urethane resin particles are not particularly limited and may be resin particles containing a urethane bond in a molecule. A polyether-type urethane resin containing an ether bond in a main chain, a polyester-type urethane resin containing an ester bond in a main chain, and a polycarbonate-type urethane resin containing a carbonate bond in a main chain are cited. Among these, the polyether-type urethane resin or the polycarbonate-type urethane resin is preferable and the polycarbonate-type urethane resin is more preferable. Anionic urethane resin particles containing a carboxy group, a sulfo group, a hydroxy group, or the like are preferable from the viewpoint of ensuring good dispersion stability.

The polyester resin particles are not particularly limited and may be those obtained by the reaction of an acid component with an alcohol component. Examples of the acid component include terephthalic acid, isophthalic acid, naphthalenedicarboxylic acid, biphenyldicarboxylic acid, oxalic acid, succinic acid, adipic acid, sebacic acid, decanedicarboxylic acid, fumaric acid, maleic acid, itaconic acid, cyclohexanedicarboxylic acid, and tetrahydrophthalic acid. Examples of the alcohol component include the glycols exemplified for the organic solvent.

The resin particles are not particularly limited. Examples of the resin particles include non-crosslinkable resin particles and crosslinkable resin particles containing a crosslinkable group. Among these, the non-crosslinkable resin particles are preferable. The crosslinkable group may be one that reacts with another crosslinkable group to form a crosslinking structure or one that reacts with a functional group different from the crosslinkable group to form a crosslinking structure. Using the non-crosslinkable resin particles tends to further enhance the storage stability and the texture of a recorded matter to be obtained.

The content of the resin particles is preferably 2.0% by mass to 15% by mass, more preferably 3.0% by mass to 10% by mass, and further more preferably 5.0% by mass to 8.0% by mass with respect to the amount of the ink composition. The fact that the content of the resin particles is 2.0% by mass or more tends to further enhance the dry rubbing fastness of a recorded matter to be obtained. The fact that the content of the resin particles is 10% by mass or less tends to further enhance the texture and dry rubbing fastness of a recorded matter to be obtained and the storage stability of the ink composition.

1.3. Plasticizer

The plasticizer used may be one that imparts plasticity or one that increases plasticity. An object to which plasticity is imparted or of which the plasticity is increased is not particularly limited and may be a synthetic resin or synthetic rubber. One that imparts plasticity to the resin particles or one that increases the plasticity of the resin particles is more preferable. The plasticizer is not particularly limited. Examples of the plasticizer include aliphatic carboxylic esters, aromatic carboxylic ester compounds, phosphoric ester compounds, cycloalkane (cycloalkene) carboxylic ester compounds, oxyester compounds, glycol ester compounds, epoxy ester compounds, sulfonamide compounds, polyester compounds, polyether compounds, glyceryl alkyl ether compounds, glyceryl alkyl ester compounds, glycol alkyl ether compounds, glycol alkyl ester compounds, ethers or esters of trimethylolpropane, and ethers or esters of pentaerythritol.

Among these, the aromatic carboxylic ester compounds, such as benzoic acid derivatives and phthalic acid derivatives; the cycloalkane (cycloalkene) carboxylic ester compounds, such as cyclohexene derivatives; and the polyether compounds are preferable, the cycloalkane (cycloalkene) carboxylic ester compounds are more preferable, and cyclohexene dicarboxylic ester compounds are further preferable. Using the plasticizer allows the film formability of the resin particles to be good and tends to further enhance the rubbing fastness, the storage stability, the delamination resistance of a printed surface, and the texture of a recorded matter.

The plasticizer preferably includes plasticizers with a SP value of 8.0 to 10. Using such plasticizers tends to further enhance the rubbing fastness, the storage stability, the delamination resistance of a printed surface, and the texture of a recorded matter. Such plasticizers have good solubility in the organic solvent, which has a SP value of 9.5 to 10.5 and, in particular, can ensure good storage stability.

The content of the plasticizer is preferably 0.1% by mass to 2.0% by mass, more preferably 0.2% by mass to 1.2% by mass, and further more preferably 0.3% by mass to 0.7% by mass with respect to the amount of the ink composition. The fact that the content of the plasticizer is 0.1% by mass or more tends to further enhance the rubbing fastness and the texture. The fact that the content of the plasticizer is 2.0% by mass or less tends to further reduce the storage stability and the delamination resistance of a printed surface.

1.4. Water

The content of the water is preferably 50% by mass to 85% by mass, more preferably 55% by mass to 80% by mass, and further more preferably 60% by mass to 75% by mass with respect to the amount of the ink composition.

1.5. Colorant

The ink composition according to this embodiment may further contain a colorant. The colorant used may be at least one of pigment and dye. Among these, the ink composition according to this embodiment is preferably a pigment textile printing ink containing pigment. In pigment textile printing, a problem with rubbing fastness is particularly likely to occur and therefore the present disclosure is particularly useful. The colorant is preferably pigment because the ink composition can be applied to various fabrics such as cotton, polyester, and nylon.

Pigment is not particularly limited. Examples of pigment include carbon blacks (C. I. Pigment Black 7) such as furnace black, lamp black, acetylene black, and channel black; inorganic pigments such as iron oxide and titanium oxide; and organic pigments such as quinacridone pigments, quinacridonequinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, isoindolinone pigments, azomethine pigments, and azo pigments.

Dye is not particularly limited. Examples of dye include acidic dyes such as C. I. Acid Yellow, C. I. Acid Red, C. I. Acid Blue, C. I. Acid Orange, C. I. Acid Violet, and C. I. Acid Black; basic dyes such as C. I. Basic Yellow, C. I. Basic Red, C. I. Basic Blue, C. I. Basic Orange, C. I. Basic Violet, and C. I. Basic Black; direct dyes such as C. I. Direct Yellow, C. I. Direct Red, C. I. Direct Blue, C. I. Direct Orange, C. I. Direct Violet, and C. I. Direct Black; reactive dyes such as C. I. Reactive Yellow, C. I. Reactive Red, C. I. Reactive Blue, C. I. Reactive Orange, C. I. Reactive Violet, and C. I. Reactive Black; and disperse dyes such as C. I. Disperse Yellow, C. I. Disperse Red, C. I. Disperse Blue, C. I. Disperse Orange, C. I. Disperse Violet, and C. I. Disperse Black. The above dyes may be used alone or in combination.

The content of the colorant is preferably 1.0% by mass to 10% by mass and more preferably 2.5% by mass to 7.5% by mass with respect to the amount of the ink composition.

1.6. Surfactant

The ink composition according to this embodiment may further contain a surfactant. The surfactant is not particularly limited. Examples of the surfactant include an acetylene glycol surfactant, a fluorinated surfactant, and a silicone surfactant.

The acetylene glycol surfactant is not particularly limited and is preferably, for example, one or more selected from the group consisting of 2,4,7,9-tetramethyl-5-decyne-4,7-diol, an alkylene oxide adduct of 2,4,7,9-tetramethyl-5-decyne-4,7-diol, 2,4-dimethyl-5-decyne-4-ol, and an alkylene oxide adduct of 2,4-dimethyl-5-decyne-4-ol.

The fluorinated surfactant is not particularly limited. Examples of the fluorinated surfactant include perfluoroalkylsulfonates, perfluoroalkylcarboxylates, perfluoroalkyl phosphonates, perfluoroalkyl-ethylene oxide adducts, perfluoroalkyl betaines, and perfluoroalkylamine oxide compounds.

Examples of the silicone surfactant include polysiloxane compounds and polyether-modified organosiloxanes.

The content of the surfactant is preferably 0.1% by mass to 1.0% by mass and more preferably 0.1% by mass to 0.5% by mass with respect to the amount of the ink composition.

1.7. pH Adjustor

The ink composition according to this embodiment may further contain a pH adjustor. The pH adjustor is not particularly limited. Examples of the pH adjustor include inorganic acids (for example, sulfuric acid, hydrochloric acid, nitric acid, and the like), inorganic bases (for example, lithium hydroxide, sodium hydroxide, potassium hydroxide, ammonia, and the like), organic bases (triethanolamine, diethanolamine, monoethanolamine, and tripropanolamine), and organic acids (for example, adipic acid, citric acid, succinic acid, and the like). Containing the pH adjustor tends to further enhance the dispersion stability. The pH adjustor may be used alone or in combination with one or more pH adjustors.

The content of the pH adjustor is preferably 0.01% by mass to 0.5% by mass, more preferably 0.05% by mass to 0.3% by mass, and further more preferably 0.05% by mass to 0.2% by mass with respect to the amount of the ink composition.

2. Ink Set

An ink set according to this embodiment includes the above aqueous ink jet ink composition and a treatment solution composition containing resin selected from the group consisting of a polyurethane resin and a polyester resin and water and may further contain another treatment solution composition containing a flocculating agent and water as required. Hereinafter, a treatment solution composition containing resin selected from the group consisting of the polyurethane resin, the polyester resin, and an acrylic resin is referred to as the posttreatment solution and another treatment solution composition containing the flocculating agent is referred to as the pretreatment solution.

2.1. Treatment Solution Composition (Posttreatment Solution)

The treatment solution composition, which is the posttreatment solution, contains resin selected from the group consisting of the polyurethane resin, the polyester resin, and the acrylic resin and water and may further contain an additive as required. Although there are fears that printed surfaces are likely to adhere to each other and an ink coating film is peeled off by breaking the adhesion, coating with the posttreatment solution enables the delamination resistance to be enhanced.

2.1.1. Resin

The polyurethane resin is not particularly limited and may be resin containing a urethane bond in a molecule. Examples of the polyurethane resin include polyether-type urethane resins containing an ether bond in a main chain, polyester-type urethane resins containing an ester bond in a main chain, and polycarbonate-type urethane resins containing a carbonate bond in a main chain are cited.

The polyester resin is not particularly limited and may be one obtained by the reaction of an acid component with an alcohol component. The acid component and alcohol component used may be the same as those described above.

The acrylic resin may be resin polymerized from a monomer containing at least an acrylate or acrylic acid and the monomer may contain another monomer such as styrene.

The content of the resin is preferably 1.0% by mass to 10% by mass, more preferably 1.5% by mass to 10% by mass, and further more preferably 2.5% by mass to 7.5% by mass with respect to the amount of the posttreatment solution.

2.1.2. Water

The content of the water is preferably 90% by mass to 99% by mass, more preferably 90% by mass to 98.5% by mass, and further more preferably 92.5% by mass to 97.5% by mass with respect to the amount of the posttreatment solution.

2.2. Treatment Solution Composition (Pretreatment Solution)

The treatment solution composition, which is the pretreatment solution, contains the flocculating agent and water and may contain a fixing resin or a surfactant.

2.2.1. Flocculating Agent

The flocculating agent is not particularly limited and is, for example, a polyvalent metal salt or a cationic resin.

The polyvalent metal salt is not particularly limited and is, for example, a polyvalent metal salt of an inorganic acid or a polyvalent metal salt of an organic acid. A polyvalent metal is not particularly limited. Examples of the polyvalent metal include alkaline-earth metals (for example, magnesium and calcium) of group 2 of the periodic table, transition metals (for example, lanthanum) of group 3 of the periodic table, earth metals (for example, aluminium) of group 13 of the periodic table, and lanthanides (for example, neodymium). Salts of these polyvalent metals are preferably carboxylates (formates, acetates, benzoates, and the like), sulfates, nitrates, chlorides, and thiocyanates.

In particular, calcium or magnesium salts of the carboxylates (formates, acetates, benzoates, and the like), calcium or magnesium sulfate, calcium or magnesium nitrate, calcium chloride, magnesium chloride, and calcium or magnesium thiocyanate are cited. The polyvalent metal salt may be used alone or in combination with one or more polyvalent metal salts.

The cationic resin is not particularly limited. Examples of the cationic resin include amine resins such as polyallylamine, poly(vinylpyridine) salts, polyalkylaminoethyl acrylates, polyalkylaminoethyl methacrylates, poly(vinylimidazole), poly(glucosamine), polyethyleneimine, polybiguanide, polyhexamethyleneguanide, and polyguanide.

The content of the flocculating agent is preferably 10% by mass to 30% by mass and more preferably 15% by mass to 25% by mass with respect to the amount of the pretreatment solution. The fact that the content of the flocculating agent is within the above range tends to further enhance the rubbing fastness and the texture.

2.2.2. Water

The content of the water is preferably 65% by mass to 90% by mass, more preferably 70% by mass to 85% by mass, and further more preferably 75% by mass to 80% by mass with respect to the amount of the pretreatment solution.

2.2.3. Fixing Resin

The fixing resin is not particularly limited. Examples of the fixing resin include a polyurethane resin, a polyester resin, and an acrylic resin. These resins used may be those described above in the posttreatment solution or the ink composition. The content of the fixing resin is preferably 0.5% by mass to 5.0% by mass and more preferably 1.0% by mass to 3.0% by mass with respect to the amount of the pretreatment solution.

2.2.4. Surfactant

The surfactant used may be one exemplified in the ink composition. The content of the surfactant is preferably 0.1% by mass to 1.0% by mass and more preferably 0.3% by mass to 0.7% by mass with respect to the amount of the pretreatment solution.

3. Recording Method

A recording method according to this embodiment includes an ink application step of applying the aqueous ink jet ink composition to a recording medium by discharging the aqueous ink jet ink composition by an ink jet process and may include a pretreatment solution application step of applying a treatment solution composition that is a pretreatment solution to the recording medium, a posttreatment solution application step of applying a treatment solution composition that is a posttreatment solution to the recording medium, and a drying step of drying the aqueous ink jet ink composition applied to the recording medium as required.

3.1. Pretreatment Solution Application Step

The pretreatment solution application step is a step of applying the pretreatment solution to the recording medium. In this step, a region coated with the pretreatment solution composition and a region coated with the ink composition are arranged to at least partly overlap each other from the viewpoint of flocculating a component of the ink composition. Performing the pretreatment solution application step allows a component of the ink composition to be flocculated on a surface of the recording medium and tends to further enhance the image quality and rubbing fastness of a recorded matter to be obtained.

A method for applying the pretreatment solution may be a method in which the pretreatment solution is applied using an ink jet system or a method in which the pretreatment solution is applied using a bar coater, a roll coater, a spray, or the like.

The pretreatment solution application step may be performed before or after the ink application step, which is described below. The pretreatment solution application step is preferably performed before the ink application step, which is described below. When the pretreatment solution application step is performed before the ink application step, the ink application step may be performed before or after the pretreatment solution is dried.

3.2. Ink Application Step

The ink application step is a step of applying the ink composition to the recording medium by discharging the ink composition by the ink jet process. Herein, an ink jet head used in the ink jet process is a head that discharges the ink composition toward the recording medium to perform recording. The head includes a cavity that discharges the stored ink composition from a nozzle, a discharge drive section that applies discharge driving force to the ink composition, and a nozzle that discharges the ink composition outside the head. The discharge drive section can be formed using an electromechanical conversion element such as a piezoelectric element that varies the volume of a cavity by mechanical deformation, an electrothermal conversion element that generates bubbles in ink by generating heat to discharge the ink, or the like.

3.3. Drying Step

The drying step is a step of drying the ink composition applied to the recording medium. The drying temperature is not particularly limited, is preferably, for example, 60° C. to 150° C., more preferably 100° C. to 150° C., and further more preferably 130° C. to 150° C. The drying time is not particularly limited and may be, for example, 30 seconds to five minutes. The fact that the plasticizer is contained allows the film formability to be good and enables treatment at such a low temperature. At such a temperature, damage to fabric can be kept low and textile printing can be successfully performed on fabric containing either selected from the group consisting of nylon fiber and polyester fiber.

The drying step may be performed not only after the ink application step but also after each of the pretreatment solution application step and the posttreatment solution application step.

3.4. Posttreatment Solution Application Step

The posttreatment solution application step is a step of applying the treatment solution composition that is the posttreatment solution to the recording medium. In this step, a region coated with the posttreatment solution composition and a region coated with the ink composition are arranged to at least partly overlap each other from the viewpoint of covering the region coated with the ink composition with the posttreatment solution to enhance the delamination resistance of a printed surface. Performing the posttreatment solution application step tends to further enhance the image quality, rubbing fastness, and delamination resistance of a recorded matter to be obtained. The posttreatment solution application step is preferably performed after the ink application step from the above viewpoint.

A method for applying the posttreatment solution may be a method in which the posttreatment solution is applied using an ink jet system or a method in which the posttreatment solution is applied using a bar coater, a roll coater, a spray, or the like.

3.5. Recording Medium

The recording medium is not particularly limited and is, for example, fabric made of natural fiber such as silk, cotton, or wool; synthetic fiber such as nylon or polyester; or semi-synthetic fiber such as rayon. Among these, fabric containing either selected from the group consisting of nylon fiber and polyester fiber is preferable. Using the recording medium enables a recorded matter excellent in rubbing fastness and texture to be obtained.

EXAMPLES

The present disclosure is further described below in detail with reference to examples and comparative examples. The present disclosure is not in any way limited to the examples.

1. Preparation of Ink Composition

Components were put into a mixture tank so as to give compositions shown in Tables 3 and 4, followed by mixing, stirring, and filtration with a 5 μm membrane filter, whereby an ink composition of each example was obtained. The values of components shown in each example in Tables 3 and 4 are in mass percent unless otherwise specified.

Abbreviations and components of products used in Tables 3 and 4 are as described below.

Pigment
  Carbon black (produced by Orient Chemical Industries Co., Ltd., the product name BONJET BLACK CW-1)
Resin Particles
  Non-crosslinkable urethane resin (produced by Mitsui Chemicals, Inc., Takelac W-6010)
Plasticizer
  Benzoic acid-based plasticizer (produced by Adeka Corporation, ADK CIZER PN-6120, an SP value of 9.8)
  Phthalic acid-based plasticizer (dioctyl phthalate, an SP value of 8.9)
  Cyclohexenedicarboxylic acid-based plasticizer (produced by New Japan Chemical Co., Ltd., SANSO CIZER-DOTH)
  Polyether-based plasticizer (produced by Adeka Corporation, ADK CIZER RS-966, an SP value of 8.6)
Organic Solvent
  Glycerin (an SP value of 16.5)
  Ethylene glycol diethyl ether (an SP value of 8.6)
  Diethylene glycol monobutyl ether (an SP value of 9.5)
  2-Methyl-1,3-pentanediol (an SP value of 10.3)
  2-Methyl-1,4-pentanediol (an SP value of 9.5 to 10.5)
  Ethylene glycol monomethyl ether (an SP value of 11.4)

1,4-Butanediol (an SP value of 12.1)
Triethylene glycol (an SP value of 10.7) pH Adjustor
KOH (potassium hydroxide)
Surfactant
Olfine E1010 (produced by Nissin Chemical Industry Co., Ltd., an acetylene glycol surfactant)

1.2. Pretreatment Solution

Components were put into a mixture tank so as to give compositions shown in Table 1, followed by mixing, stirring, and filtration with a 5 μm membrane filter, whereby a pretreatment solution of each example was obtained. The values of components shown in each example in Table 1 are in mass percent unless otherwise specified.

TABLE 1

|  | Pretreatment solution |
| --- | --- |
| Calcium nitrate tetrahydrate | 20 |
| Fixing resin | 2 |
| Surfactant | 0.5 |
| Water | Balance |

Flocculating Agent (Calcium Nitrate Tetrahydrate)
Fixing resin (produced by Japan Coating Resin Corporation, Mowinyl 6960)
Surfactant (produced by Nissin Chemical Industry Co., Ltd., Olfine E1010)

1.3. Posttreatment Solution

Components were put into a mixture tank so as to give compositions shown in Table 2, followed by mixing, stirring, and filtration with a 5 μm membrane filter, whereby a posttreatment solution of each example was obtained. The values of components shown in each example in Table 2 are in mass percent unless otherwise specified.

TABLE 2

|  | Posttreatment solution | | |
| --- | --- | --- | --- |
|  | 1 | 2 | 3 |
| Non-crosslinkable urethane resin | 5 | — | — |
|  | — | 5 | — |
|  | — | — | 5 |
|  | Balance | Balance | Balance |

Non-crosslinkable urethane resin (produced by Mitsui Chemicals, Inc., Takelac W-6011)
Polyester resin (produced by Toyobo Co., Ltd., VYLONAL MD 2000)
Non-crosslinkable acrylic resin (produced by Japan Coating Resin Corporation, Mowinyl 6960)

2. Evaluation

2.1. Storage Stability

After each ink composition prepared as described above was poured into a sample bottle and the sample bottle was hermetically sealed, the sample bottle was put in a 40° C. thermostatic chamber and was stored for two weeks. The ink composition was measured for viscosity in accordance with JIS Z 8809 using a vibrational viscometer before and after storage. The rate of change in viscosity after leaving for two weeks was calculated, followed by evaluating the storage stability in accordance with evaluation criteria below. When the evaluation of storage stability is A or B, it can be said that a good result has been obtained.

Evaluation Criteria
A: The rate of change in viscosity is 3% or less.
B: The rate of change in viscosity is more than 3% to 5%.
C: The rate of change in viscosity is more than 5%.

2.2. Rubbing Fastness

A cartridge of an ink jet printer, PM-870C (manufactured by Seiko Epson Corporation), was filled with the above ink composition. After filling, a nozzle check pattern was printed, whereby it was confirmed that there was no filling failure or nozzle clogging. A solid pattern was printed on fabric (100% polyester (PES) or nylon, plain weave) coated with the pretreatment solution in such a manner that the weight of discharged ink per dot was about 40 ng and the horizontal and vertical ink coverage density was 360 dpi× 360 dpi.

The pretreatment solution was fixed in such a manner that after the pretreatment solution was applied to the fabric at a pickup ratio of 80% using a padder, the pretreatment solution was heated at 100° C. for three minutes.

Next, after the solid pattern was printed and was left for one minute, a posttreatment solution was applied to the solid pattern by ink jet under the same conditions again, followed by heating at 140° C. for three minutes, whereby a recorded matter was obtained. In Example 5, a solid pattern was printed without using any posttreatment solution, followed by heating at 140° C. for three minutes, whereby a recorded matter was obtained.

Recorded matters obtained as described above were evaluated for rubbing fastness in accordance with ISO-105 X12. Evaluation criteria are shown below. When the evaluation of rubbing fastness is either of A to C, it can be said that a good result has been obtained.

Evaluation Criteria
A: Above wet rubbing grade 3
B: Wet rubbing grade 3
C: Wet rubbing grade 2-3
D: Wet rubbing grade 2 or below

2.3. Texture

A printed portion of a recorded matter prepared in the above Rubbing Fastness was directly touched with a palm and the touch of the printed portion was determined in accordance with evaluation criteria below. Decision was made by three people and the most supported opinion was taken as a result of the decision. When the decision differed for each person, an opinion therebetween was taken as a result of the decision.

Evaluation Criteria
A: The hardness and touch of a printed portion are almost the same as those of original fabric and are good.
B: The hardness or touch of a printed portion slightly differs from that of original fabric and is satisfactory for practical use.
C: The hardness or touch of a printed portion is poorer than that of original fabric and is allowable.
D: The hardness or touch of a printed portion is poorer than that of original fabric and is unallowable.

2.4. Delamination Resistance

A recorded matter prepared in the above Rubbing Fastness was folded into two parts such that portions of a solid pattern faced each other. A load of 10 gf/cm$^2$ was applied to the folded record, which was left for one week. Thereafter, the folded recorded matter was opened and whether a printed surface was delaminated was visually confirmed. The delamination resistance was evaluated based on the confirmation results. Evaluation criteria are shown below.
A: No adhesion or delamination is observed on a printed surface.

B: Adhesion is observed on a printed surface and no delamination is observed thereon.
C: Slight delamination is observed on a printed surface.
D: Delamination is observed on a printed surface.

2.5. Environmental Adaptability

An ink composition composed of components with relatively high safety to human and the like was rated A and others were rated B.

TABLE 3

| | | Example | | | | | |
|---|---|---|---|---|---|---|---|
| | | 1 | 2 | 3 | 4 | 5 | 6 |
| Pigment | Carbon black (solid matter) | 5 | 5 | 5 | 5 | 5 | 5 |
| Resin particles | Non-crosslinkable urethane resin | 7 | 7 | 7 | 7 | 7 | 7 |
| Plasticizer | Benzoic acid-based plasticizer | — | — | 0.5 | — | — | — |
| | Phthalic acid-based plasticizer | 0.5 | — | — | — | — | — |
| | Cyclohexenedicarboxylic acid-based plasticizer | — | 0.5 | — | — | 0.5 | 0.2 |
| | Polyether-based plasticizer | — | — | — | 0.5 | — | — |
| Solvent | Glycerin SP16.5 | 10 | 10 | 10 | 10 | 10 | 10 |
| | Ethylene glycol diethyl ether SP8.6 | — | — | — | — | — | — |
| | Diethylene glycol monobutyl ether SP9.5 | — | — | — | — | — | — |
| | 2-Methyl-1,3-pentanediol SP10.3 | 3 | 3 | 3 | 3 | 3 | 3 |
| | 2-Methyl-1,4-pentanediol | — | — | — | — | — | — |
| | Ethylene glycol monomethyl ether SP11.4 | — | — | — | — | — | — |
| | 1,4-Butanediol SP12.1 | — | — | — | — | — | — |
| | Triethylene glycol SP10.7 | 5 | 5 | 5 | 5 | 5 | 5 |
| pH Adjustor | KOH | 0.1 | 0.1 | 0.1 | 0.1 | 0.1 | 0.1 |
| Surfactant | Olfine E1010 | 0.3 | 0.3 | 0.3 | 0.3 | 0.3 | 0.3 |
| Water | | Balance | Balance | Balance | Balance | Balance | Balance |
| Drying condition | Drying temperature (° C., 3 min) | 140 | 140 | 140 | 140 | 140 | 140 |
| Fabric | | PES | PES | PES | PES | PES | PES |
| Posttreatment solution No. | | 1 | 1 | 1 | 1 | — | 1 |
| Evaluation | Storage stability | A | A | A | B | A | A |
| | Rubbing fastness | B | B | B | B | C | B |
| | Texture | B | B | A | B | A | C |
| | Delamination resistance | B | A | B | A | D | A |
| | Environmental adaptability | B | A | A | A | A | A |

| | | Example | | | | | |
|---|---|---|---|---|---|---|---|
| | | 7 | 8 | 9 | 10 | 11 | 12 |
| Pigment | Carbon black (solid matter) | 5 | 5 | 5 | 5 | 5 | 5 |
| Resin particles | Non-crosslinkable urethane resin | 7 | 3 | 10 | 7 | 7 | 7 |
| Plasticizer | Benzoic acid-based plasticizer | — | — | — | — | — | — |
| | Phthalic acid-based plasticizer | — | — | — | — | — | — |
| | Cyclohexenedicarboxylic acid-based plasticizer | 0.8 | 0.5 | 0.5 | 0.5 | 0.5 | 0.5 |
| | Polyether-based plasticizer | — | — | — | — | — | — |
| Solvent | Glycerin SP16.5 | 10 | 10 | 10 | 10 | 10 | 10 |
| | Ethylene glycol diethyl ether SP8.6 | — | — | — | — | — | — |
| | Diethylene glycol monobutyl ether SP9.5 | — | — | — | 3 | — | — |
| | 2-Methyl-1,3-pentanediol SP10.3 | 3 | 3 | 3 | — | — | 1 |
| | 2-Methyl-1,4-pentanediol | — | — | — | — | 3 | — |
| | Ethylene glycol monomethyl ether SP11.4 | — | — | — | — | — | — |
| | 1,4-Butanediol SP12.1 | — | — | — | — | — | — |
| | Triethylene glycol SP10.7 | 5 | 5 | 5 | 5 | 5 | 5 |
| pH Adjustor | KOH | 0.1 | 0.1 | 0.1 | 0.1 | 0.1 | 0.1 |
| Surfactant | Olfine E1010 | 0.3 | 0.3 | 0.3 | 0.3 | 0.3 | 0.3 |
| Water | | Balance | Balance | Balance | Balance | Balance | Balance |
| Drying condition | Drying temperature (° C., 3 min) | 140 | 140 | 140 | 140 | 140 | 140 |
| Fabric | | PES | PES | PES | PES | PES | PES |
| Posttreatment solution No. | | 1 | 1 | 1 | 1 | 1 | 1 |
| Evaluation | Storage stability | A | A | B | A | A | B |
| | Rubbing fastness | A | C | A | C | B | C |
| | Texture | A | B | B | C | B | C |
| | Delamination resistance | C | A | A | A | A | A |
| | Environmental adaptability | A | A | A | A | A | A |

TABLE 4

| | | Example | | | | | |
|---|---|---|---|---|---|---|---|
| | | 13 | 14 | 15 | 16 | 17 | 18 |
| Pigment | Carbon black (solid matter) | 5 | 5 | 5 | 5 | 5 | 5 |
| Resin particles | Non-crosslinkable urethane resin | 7 | 7 | 7 | 7 | 7 | 7 |
| Plasticizer | Benzoic acid-based plasticizer | — | — | — | — | — | — |
| | Phthalic acid-based plasticizer | — | — | — | — | — | — |

TABLE 4-continued

|  |  |  |  |  |  |  |  |
|---|---|---|---|---|---|---|---|
|  | Cyclohexenedicarboxylic acid-based plasticizer | 0.5 | 0.5 | 0.5 | 0.5 | 0.5 | 0.5 |
|  | Polyether-based plasticizer | — | — | — | — | — | — |
| Solvent | Glycerin SP16.5 | 10 | 10 | 10 | 10 | 10 | 10 |
|  | Ethylene glycol diethyl ether SP8.6 | — | — | — | — | — | — |
|  | Diethylene glycol monobutyl ether SP9.5 | — | — | — | — | — | — |
|  | 2-Methyl-1,3-pentanediol SP10.3 | 2.5 | 3.5 | 10 | 3 | 3 | 3 |
|  | 2-Methyl-1,4-pentanediol | — | — | — | — | — | — |
|  | Ethylene glycol monomethyl ether SP11.4 | — | — | — | — | — | — |
|  | 1,4-Butanediol SP12.1 | — | — | — | — | — | — |
|  | Triethylene glycol SP10.7 | 5 | 5 | 5 | 5 | 5 | 5 |
| pH Adjustor | KOH | 0.1 | 0.1 | 0.1 | 0.1 | 0.1 | 0.1 |
| Surfactant | Olfine E1010 | 0.3 | 0.3 | 0.3 | 0.3 | 0.3 | 0.3 |
| Water |  | Balance | Balance | Balance | Balance | Balance | Balance |
| Drying condition | Drying temperature (° C., 3 min) | 140 | 140 | 140 | 130 | 150 | 140 |
| Fabric |  | PES | PES | PES | PES | PES | Nylon |
| Posttreatment solution No. |  | 1 | 1 | 1 | 1 | 1 | 1 |
| Evaluation | Storage stability | A | A | B | A | A | A |
|  | Rubbing fastness | C | B | A | C | A | B |
|  | Texture | C | B | B | B | B | B |
|  | Delamination resistance | A | C | C | A | A | A |
|  | Environmental adaptability | A | A | A | A | A | A |

|  |  | Example | | Comparative Example | | | |
|---|---|---|---|---|---|---|---|
|  |  | 19 | 20 | 1 | 2 | 3 | 4 |
| Pigment | Carbon black (solid matter) | 5 | 5 | 5 | 5 | 5 | 5 |
| Resin particles | Non-crosslinkable urethane resin | 7 | 7 | 7 | 7 | 7 | 7 |
| Plasticizer | Benzoic acid-based plasticizer | — | — | — | — | — | — |
|  | Phthalic acid-based plasticizer | — | — | — | — | — | — |
|  | Cyclohexenedicarboxylic acid-based plasticizer | 0.5 | 0.5 | — | 0.5 | 0.5 | 0.5 |
|  | Polyether-based plasticizer | — | — | — | — | — | — |
| Solvent | Glycerin SP16.5 | 10 | 10 | 10 | 10 | 10 | 10 |
|  | Ethylene glycol diethyl ether SP8.6 | — | — | — | 3 | — | — |
|  | Diethylene glycol monobutyl ether SP9.5 | — | — | — | — | — | — |
|  | 2-Methyl-1,3-pentanediol SP10.3 | 3 | 3 | 3 | — | — | — |
|  | 2-Methyl-1,4-pentanediol | — | — | — | — | — | — |
|  | Ethylene glycol monomethyl ether SP11.4 | — | — | — | — | 3 | — |
|  | 1,4-Butanediol SP12.1 | — | — | — | — | — | 3 |
|  | Triethylene glycol SP10.7 | 5 | 5 | 5 | 5 | 5 | 5 |
| pH Adjustor | KOH | 0.1 | 0.1 | 0.1 | 0.1 | 0.1 | 0.1 |
| Surfactant | Olfine E1010 | 0.3 | 0.3 | 0.3 | 0.3 | 0.3 | 0.3 |
| Water |  | Balance | Balance | Balance | Balance | Balance | Balance |
| Drying condition | Drying temperature (° C., 3 min) | 140 | 140 | 140 | 140 | 140 | 140 |
| Fabric |  | PES | PES | PES | PES | PES | PES |
| Posttreatment solution No. |  | 2 | 3 | 1 | 1 | 1 | 1 |
| Evaluation | Storage stability | A | A | A | C | C | C |
|  | Rubbing fastness | A | B | D | C | A | A |
|  | Texture | C | B | D | C | B | B |
|  | Delamination resistance | A | C | A | A | C | C |
|  | Environmental adaptability | A | A | A | A | A | A |

4. Evaluation Results

Evaluation results of the examples and the comparative examples were shown in Tables 3 and 4. As is clear from Tables 3 and 4, using a plasticizer and a predetermined organic solvent further enhances the storage stability and the rubbing fastness and also enhances the texture, the delamination resistance, or the environmental adaptability.

What is claimed is:

1. An aqueous ink jet ink composition containing:
   an organic solvent with an SP value of 9.5 to 10.5;
   resin particles;
   a plasticizer; and
   water,
   wherein 1.0% by mass to 10.0% by mass of the organic solvent is contained with respect to an amount of the aqueous ink jet ink composition.

2. The aqueous ink jet ink composition according to claim 1, wherein the plasticizer includes a plasticizer with an SP value of 8 to 10.

3. The aqueous ink jet ink composition according to claim 1, wherein the plasticizer includes a cyclohexenedicarboxylic acid-based compound.

4. The aqueous ink jet ink composition according to claim 1, wherein a content of the plasticizer is 0.1% by mass to 2.0% by mass with respect to the amount of the aqueous ink jet ink composition.

5. The aqueous ink jet ink composition according to claim 1, wherein methylpentanediol is contained as the organic solvent with the SP value of 9.5 to 10.5.

6. An ink set comprising:
   the aqueous ink jet ink composition according to claim 1; and
   a treatment solution composition containing a resin selected from a polyurethane resin, a polyester resin, and an acrylic resin and water.

7. A recording method comprising an ink application step of applying the aqueous ink jet ink composition according to claim 1 to a recording medium by discharging the aqueous ink jet ink composition by an ink jet process.

8. The recording method according to claim 7, further comprising a treatment solution application step of applying a treatment solution composition containing a resin selected from a polyurethane resin and a polyester resin and water to the recording medium.

9. The recording method according to claim 7, further comprising a drying step of drying the aqueous ink jet ink composition applied to the recording medium.

10. The recording method according to claim 9, wherein the recording medium is heated to 130° C. to 150° C. in the drying step.

11. The recording method according to claim 7, wherein the recording medium is a fabric.

12. The recording method according to claim 11, wherein the fabric contains a fiber selected from the group consisting of a nylon fiber and a polyester fiber.

* * * * *